United States Patent
Bergfeld (10) Patent No.: US 10,788,092 B2
(45) Date of Patent: Sep. 29, 2020

(54) DAMPING ADJUSTING SYSTEM WITH PERPENDICULAR SEAL RING

(71) Applicant: Kendrion (Villingen) GmbH, Villingen-Schwenningen (DE)

(72) Inventor: Björn Bergfeld, Balingen-Endingen (DE)

(73) Assignee: Kendrion (Villingen) GmbH, Villingen-Schwenninge ( * ) Notice: Subject to any disclaimer, the term of this patent is extended or adjusted under 35 U.S.C. 154(b) by 40 days.

(21) Appl. No.: 16/083,355

(22) PCT Filed: Mar. 8, 2017

(86) PCT No.: PCT/EP2017/055498
§ 371 (c)(1),
(2) Date: Sep. 7, 2018

(87) PCT Pub. No.: WO2017/153503
PCT Pub. Date: Sep. 14, 2017

(65) Prior Publication Data
US 2019/0032744 A1    Jan. 31, 2019

(30) Foreign Application Priority Data
Mar. 9, 2016 (DE) .......................... 10 2016 104 338

(51) Int. Cl.
*F16F 9/46* (2006.01)

(52) U.S. Cl.
CPC .......... *F16F 9/464* (2013.01); *F16F 2222/06* (2013.01); *F16F 2222/12* (2013.01); *F16F 2228/066* (2013.01)

(58) Field of Classification Search
CPC .......... F16F 9/464; F16F 9/465; F16F 9/3485; F16F 2228/066; F16F 2222/06; F16F 2222/12

(Continued)

(56) References Cited

U.S. PATENT DOCUMENTS

| 5,531,422 A | 7/1996 | Ward et al. |
| 6,119,831 A * | 9/2000 | Knecht ..................... F16F 9/46 188/282.2 |

(Continued)

FOREIGN PATENT DOCUMENTS

| DE | 19822448 | 1/1999 |
| DE | 102009059808 | 6/2011 |

(Continued)

OTHER PUBLICATIONS

World Intellectual Property Organization, "International Search Report," and English translation thereof, issued in International Application No. PCT/EP2017/055498, dated May 30, 2017, document of 5 pages.

(Continued)

*Primary Examiner* — Robert A. Siconolfi
*Assistant Examiner* — San M Aung
(74) *Attorney, Agent, or Firm* — Akerman LLP; Peter A. Chiabotti (57) ABSTRACT

The application provides a damping adjusting system having a guide tube which is arranged in an outer housing and which comprises a lateral outer wall. The interior of the guide tube being delimited at the end face by a base part. The guide tube can also have a magnet coil; an electromagnetically movable armature which is guided in the guide tube along a movement axis; an exterior which surrounds the outer housing; and a ventilation bore which connects the interior to the exterior and which is guided through the base part and the outer housing. The ventilation bore has two interconnected sections. A first section is guided through the base part and the first section has a first opening arranged on the base part on the interior side and a second opening arranged on the lateral outer wall, and a second section is guided through the outer housing.

20 Claims, 4 Drawing Sheets (58) Field of Classification Search
USPC .... 188/266.6, 282.2, 317–318, 266.1, 266.5, 188/282.1, 282.8, 313, 316, 287
See application file for complete search history.

(56) References Cited

U.S. PATENT DOCUMENTS

| | | | |
|---|---|---|---|
| 7,757,826 | B2 | 7/2010 | Hayama et al. |
| 2003/0098209 | A1 | 5/2003 | Nakadate |
| 2003/0132073 | A1 | 7/2003 | Nakadate |
| 2006/0225976 | A1* | 10/2006 | Nakadate ............... F16F 9/464 188/266 |
| 2008/0236966 | A1* | 10/2008 | Yamaguchi ............ F16F 9/465 188/275 |
| 2008/0257668 | A1 | 10/2008 | Yamaguchi et al. |
| 2009/0272611 | A1* | 11/2009 | Hayama ............... F16F 9/3485 188/282.1 |

FOREIGN PATENT DOCUMENTS

| | | |
|---|---|---|
| DE | 102014215563 | 2/2016 |
| EP | 1975453 | 10/2008 |
| JP | 2003166584 | 6/2003 |
| JP | 2007309409 | 11/2007 |
| JP | 2008-267487 | 11/2008 |

OTHER PUBLICATIONS

German Patent Office, "Office Action," issued in German Patent Application No. 10 2016 104 338.9 , dated Nov. 28, 2016, document of 10 pages.

Japanese Patent Office, "Office Action," issued in Japanese Patent Application No. 12018-547283, dated Sep. 24, 2019, document of 11 pages.

* cited by examiner

DAMPING ADJUSTING SYSTEM WITH PERPENDICULAR SEAL RING

CROSS REFERENCE TO RELATED APPLICATIONS

This application is a § 371 National Phase of PCT/EP2017/055498, filed Mar. 8, 2017, the entirety of which is incorporated by reference and which claims priority to German Patent Application No. 10 2016 104 338.9, filed Mar. 9, 2016.

BACKGROUND

The present application relates to a damping adjusting system according to the disclosure herein, and a vibration damper having a damping valve unit designed as a damping adjusting system.

SUMMARY

Adjustable damping systems or damping adjusting systems have become available in the meantime in many vehicles and offer a high level of driving comfort and more driving safety to the automobile driver. For this purpose, the control unit of the suspension controller can adapt the damping forces individually in a few milliseconds using data, inter alia, from the acceleration and distance sensors for each wheel. In this manner, annoying excitations of the road are kept away from the passengers as much as possible and the damper is actuated such that the vehicle body movements are stabilized in the best possible manner.

In this case, the dampers generally have a damper tube or an outer cylinder, in which an integrated adjusting system is movable back-and-forth in a damping oil. The integrated adjusting system, which is designed as a piston movable back-and-forth in the outer cylinder, has a pilot stage having a magnetic coil and an armature, which controls the pressure applied to a main stage in dependence on the electric current which is conducted through the magnetic coil, via the movement of the armature. With the aid of the armature in the pilot stage, valves in the main stage are opened or closed as needed in this case, in order to thus control the oil pressure in the damper tube and in this manner achieve softer or harder damping.

To minimize the power consumption of the system, the magnetic coil is designed such that it does not exert force on the pilot stage in the deenergized state. During travel, the damper is predominantly operated in the range of lower damping forces and thus with less energizing, for example, during calm travel over a relatively level roadway surface. High damping forces, for example, to stabilize the body during dynamic driving maneuvers or travel through potholes, are only set briefly.

However, air bubbles can be enclosed or can form in the damping oil, which, in particular if they penetrate into the armature chamber of the main stage, can accumulate therein and cause disturbances, because the damper is operated vertically and is closed on top, and therefore penetrated air bubbles can no longer escape from the inner chamber in which the armature is moved. The damping oil and the air bubbles are then located in the inner chamber in which the armature of the pilot stage is moved back-and-forth when it is electromagnetically actuated by the magnetic coil. Because of the different viscosities, and due to different pressure-temperature-volume properties of the damping oil and the air bubble, this can have the result that with equal energizing of equal duration of the magnetic coil, the armature experiences a different deflection when air bubbles are located in the inner chamber. Different actuations of the main stage, which cause different damping in the damper, thus result with equal energizing of the magnetic coil.

The present application provides a damping adjusting system which does not have these disadvantages.

The damping adjusting system has a guide tube arranged in an outer housing having a lateral outer wall, wherein the inner chamber of the guide tube is delimited on the end face by a bottom part. Furthermore, the damping adjusting system has at least one magnetic coil arranged between the outer housing and the guide tube, an electromagnetically movable armature guided in the guide tube along a movement axis, an outer chamber, which encloses the outer housing, and a venting borehole, which connects the inner chamber to the outer chamber and is led through the bottom part and through the outer housing. The venting borehole has two sections connected to one another, wherein a first section is led through the bottom part, wherein the first section has a first opening arranged on the inner chamber side on the bottom part and a second opening arranged on the lateral outer wall. The venting borehole furthermore has a second section, which is led through the outer housing. The venting borehole is sealed off by a seal circumferential around the venting borehole between the guide tube and the outer housing. In this manner, air bubbles which have been flushed into the inner chamber, in which the electromagnetically movable armature moves back-and-forth, can be transported through the venting borehole into the outer chamber outside the outer housing, without damping oil being able to penetrate into the intermediate chamber, in which the magnetic coil is arranged.

In this case, the first opening is advantageously arranged facing in the direction of the movement axis and the second opening is arranged facing perpendicular to the movement axis. In this manner, using only a very small seal ring, which seals off the venting borehole between the outer housing and the guide tube, it is possible that no oil will leak into the intermediate chamber, in which the magnet is arranged and in which the electrical contacts are also arranged.

The second opening is advantageously located frontally opposite to the opening of the second section oriented toward the inner wall of the outer housing, in order to establish the shortest possible connection between the first section and the second section of the venting borehole between the guide tube and the outer housing.

The first section of the venting borehole can have a first subsection, which is led in a straight line and is open to the inner chamber of the guide tube, and also a second subsection, which is led in a straight line and is open to the lateral outer wall of the guide tube, wherein the second subsection extends through the bottom part of the guide tube at an angle to the first subsection. The angle between the first subsection and the second subsection is advantageously a substantially right angle in this case, wherein the term "substantially right angle" is to mean that the angle between the two subsections can deviate by up to 10° from a right angle.

The first subsection can have a subregion having a reduced diameter, so that the collected air can be transported or pressed rapidly through this subregion, but the damping oil can only escape in insignificant quantities per unit of time through this venting borehole because of its higher viscosity. It is thus ensured that the venting borehole only exerts insignificant influence on the damping. Such a subregion could, of course, additionally or alternatively be arranged in the second subsection. The diameter in the subregion having the reduced diameter is preferably between 0.2 mm and 0.3 mm, wherein it is particularly preferably approximately 0.25 mm.

The outer housing advantageously encloses at least a part of the lateral outer wall of the guide tube in a formfitting manner. A stable and fixed mounting of the guide tube in the outer housing can thus be achieved. The second subsection of the venting borehole is preferably led through the bottom part substantially perpendicularly to the movement axis of the armature. The venting borehole is preferably also led through the outer housing substantially perpendicularly to the movement axis.

The seal, by which the venting borehole is sealed off between the guide tube and the outer housing, is preferably an O-ring seal, but particularly preferably an X-ring seal. An X-ring seal, which is also called a quad-ring seal, describes a seal profile, the geometry of which located in a square produces eight contact zones. In this manner, in contrast to an O-ring seal, which can only produce four contact zones in a square, the quad-ring seal is a more secure seal, in particular also because the seal seam lies between the protrusions. Moreover, the quad-ring seal has a higher stability against tilting or twisting than an O-ring seal.

In one particularly preferred embodiment, the outer housing has a tubular receptacle opening in the direction of the movement axis for accommodating the guide tube, the inner surface of which has a flat partial surface, on which the inwardly oriented opening of the second section is formed. The seal can be accommodated in this case in a ring-shaped groove on the outer housing and/or on the guide tube around the venting borehole. Because the seal is arranged in a ring shape on a flat surface around the venting borehole, a particularly secure seal without tilting in relation to the intermediate chamber can be achieved.

The guide tube is preferably a pole tube and the at least one magnetic coil is preferably wound around the guide tube.

The armature can have a return spring, which is supported in the guide tube, preferably on a surface delimiting the inner chamber and arranged opposite to the bottom part, so that in the deenergized state, the armature always returns back into the same starting position.

The armature is preferably formed as a hollow tube. It preferably has a through borehole, through which the damper oil, depending on the movement direction of the armature, can either flow into the inner chamber of the guide tube or can flow out of the inner chamber of the guide tube. The outer chamber is also filled with a liquid damping medium, preferably with a damping oil.

The vibration damper has a damper tube and a damping valve unit designed as a damping adjusting system, wherein the outer chamber is delimited by the damper tube, which is preferably formed as an outer cylinder, and the outer housing is guided axially in the damper tube so it is movable back-and-forth along the movement axis.

Using the described construction, in which a seal ring is arranged laterally between the guide tube and the outer housing in order to seal off the intermediate chamber, in which the electromagnet is located, on the one hand, additional components can be saved in relation to a construction in which the venting borehole is only guided parallel to the movement axis of the electromagnetically movable armature. The construction of the damping adjusting system and thus also the construction of the vibration damper are thus simplified.

BRIEF DESCRIPTION OF THE DRAWINGS

The damping adjusting system according to the present disclosure will be explained in greater detail hereafter on the basis of a specific exemplary embodiment, but without being restricted to this exemplary embodiment. In the figures.

DETAILED DESCRIPTION

Figure 1:
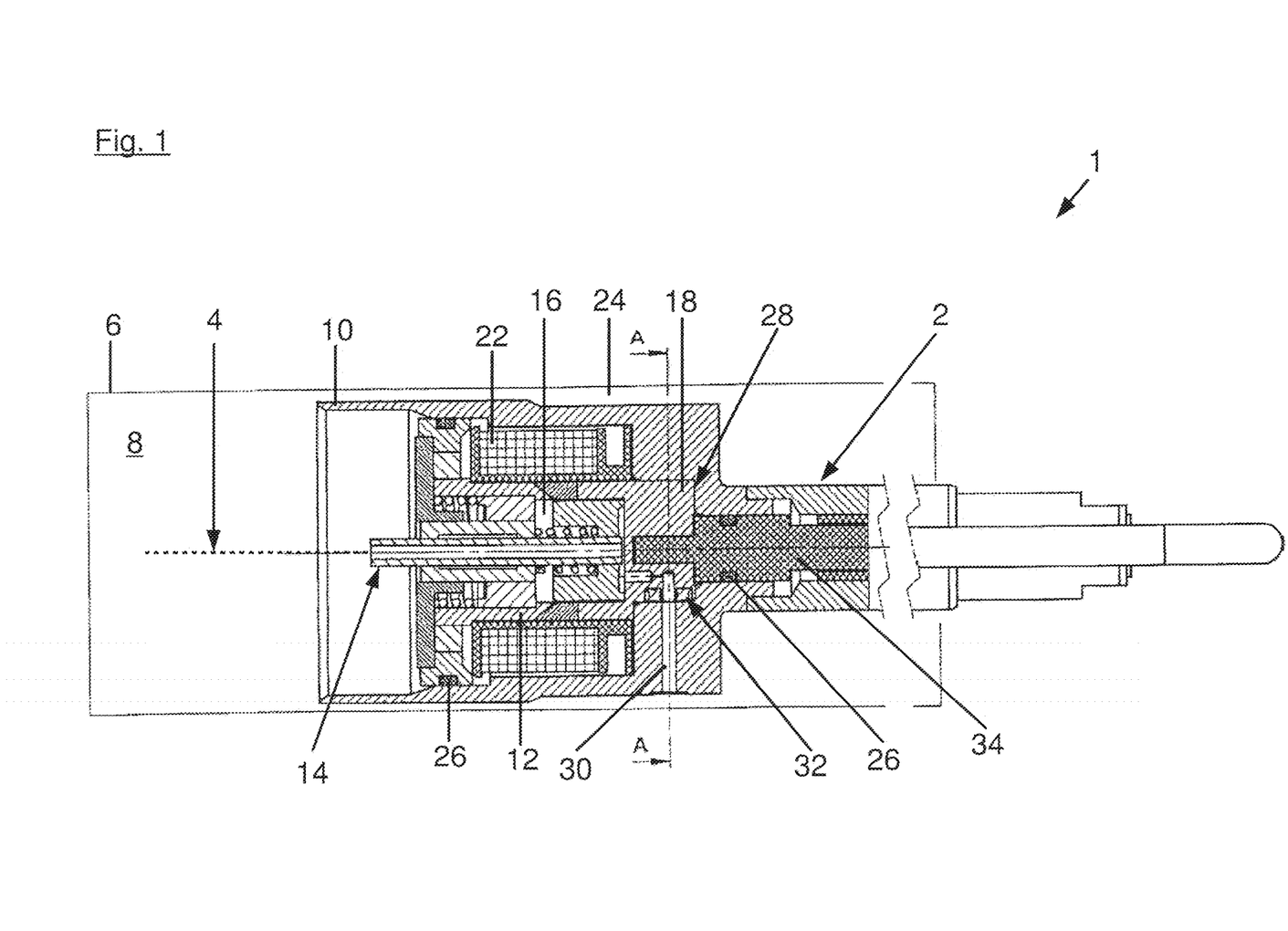
FIG. 1 shows a damping adjusting system in a vibration damper in cross section along the movement axis of the armature.

FIG. 1 shows a vibration damper 1, with a damping adjusting system 2, which is guided so it is movable back-and-forth along a movement axis 4 in a damper tube 6, which is formed as an outer cylinder. A damping medium 8 in the form of a damping oil is located in the outer cylinder 6. The damping adjusting system 2 has an outer housing 10, a guide tube 12, which is arranged in the outer housing 10 and is formed as a pole tube, and an armature 14 guided in the pole tube 12 so it is movable along the movement axis 4. The armature 14 is guided so it is movable back-and-forth in an inner chamber 16 of the pole tube 12 between a bottom part 18 of the pole tube 12 and a support surface 20.

A magnetic coil 22, which is capable of electromagnetically actuating the armature 14 when it is energized, is arranged in the intermediate chamber between the outer housing 10 and the pole tube 12. An outer chamber 24 which, like the inner chamber 16, is filled with damping oil 8, is located between the outer housing 10 and the damper tube 6. Magnet chamber seals 26 seal off the intermediate chamber, in which the magnetic coil 22 is located, in relation to the outer chamber 24 filled with damping oil 8 and in relation to the inner chamber 16.

The bottom part 18 of the guide tube 12 is accommodated in a receptacle opening 28 of the outer housing 10. A venting borehole 30 connects the outer chamber 24 to the inner chamber 16. A circumferential seal 32, which encloses the venting borehole 30 and seals off the venting borehole 30 in relation to the intermediate chamber, in which the magnetic coil 22 is arranged, is arranged between the guide tube 12 and the outer housing 10, and therefore no medium which flows through the venting borehole 30 from the inner chamber 16 into the outer chamber 24 or from the outer chamber 24 into the inner chamber 16 can reach the intermediate chamber. An electrical fitting 34, which is arranged in the outer housing 10, supplies the magnetic coil 22 with electrical current.

Figure 2:
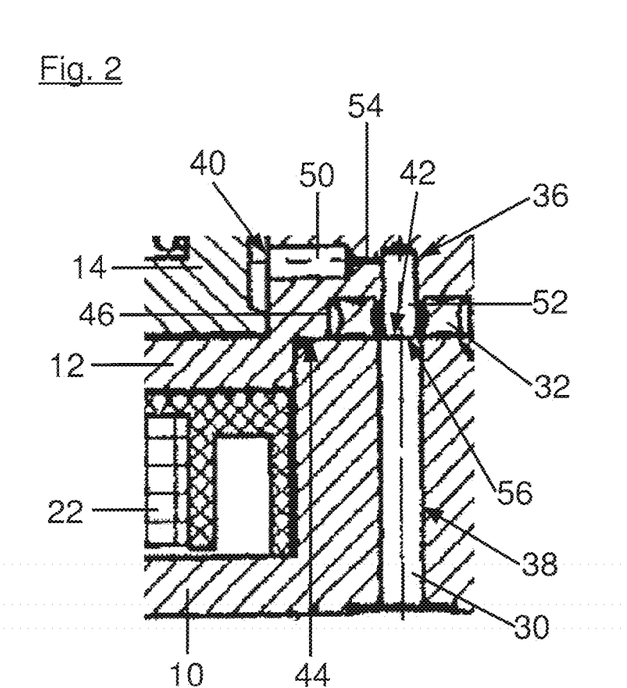
FIG. 2 shows a detail of the damping adjusting system according to FIG. 1 having the venting borehole.
Figure 3:
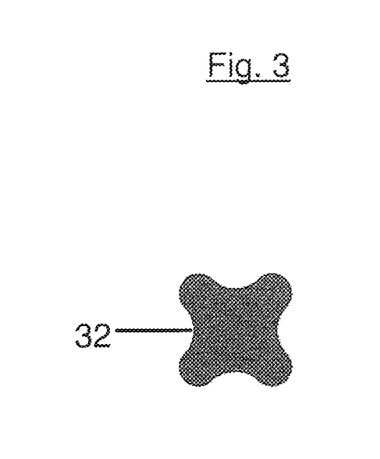
FIG. 3 shows a circumferential X-ring seal in cross section.

FIG. 2 shows the part of the damping adjusting system 2 having the venting borehole 30 in an enlarged illustration. The venting borehole 30 has a first section 36 and a second section 38. The first section 36 of the venting borehole 30 extends between a first opening 40, which is arranged on the bottom part 18 of the guide tube 12, up to a second opening 42, which is arranged on a lateral outer wall 44 of the guide tube 12. A ring-shaped groove 46 arranged in the bottom part 18 around the venting borehole 30 accommodates the circumferential seal 32, which is formed in the present case as an X-ring and the cross section of which is shown in FIG. 3. The intermediate chamber, in which the magnetic coil 22 is located, is sealed off to the venting borehole 30 by this seal 32. The circumferential seal 32 is seated both on the outer housing 10, and also on the lateral outer wall 44 of the bottom part 18 of the guide tube 12. The circumferential seal 32 is seated in this case on a flat partial surface 48 of the outer housing 10.

The first section 36 of the venting borehole 30 has a first subsection 50 and a second subsection 52. The first subsection 50 and the second subsection 52 are arranged perpendicularly to one another and are connected via a subregion of the first subsection 50, which has a reduced internal diameter in relation to the first subsection 50, in the present case, for example, 0.25 mm, to the second subsection 52. The second section 38 of the venting borehole 30 is directly connected via the opening 56 of the outer housing 10 oriented away from the outer chamber 24 to the second subsection 52 of the first section 36 of the venting borehole 30.

If air bubbles form in the inner chamber 16, for example, they can thus move through the opening 40 in the bottom part 18 via the first subsection 50 and the constricted subregion 54 of the first section 36 into the second subsection 52 of the first section 36, can move through the circumferential seal 32 and the second opening 42 in the lateral outer wall 44 of the bottom part 18 via the opening 56 in the outer housing 10 into the second section 38 of the venting borehole 30, and can be transported from there into the outer chamber 24.

Figure 4:
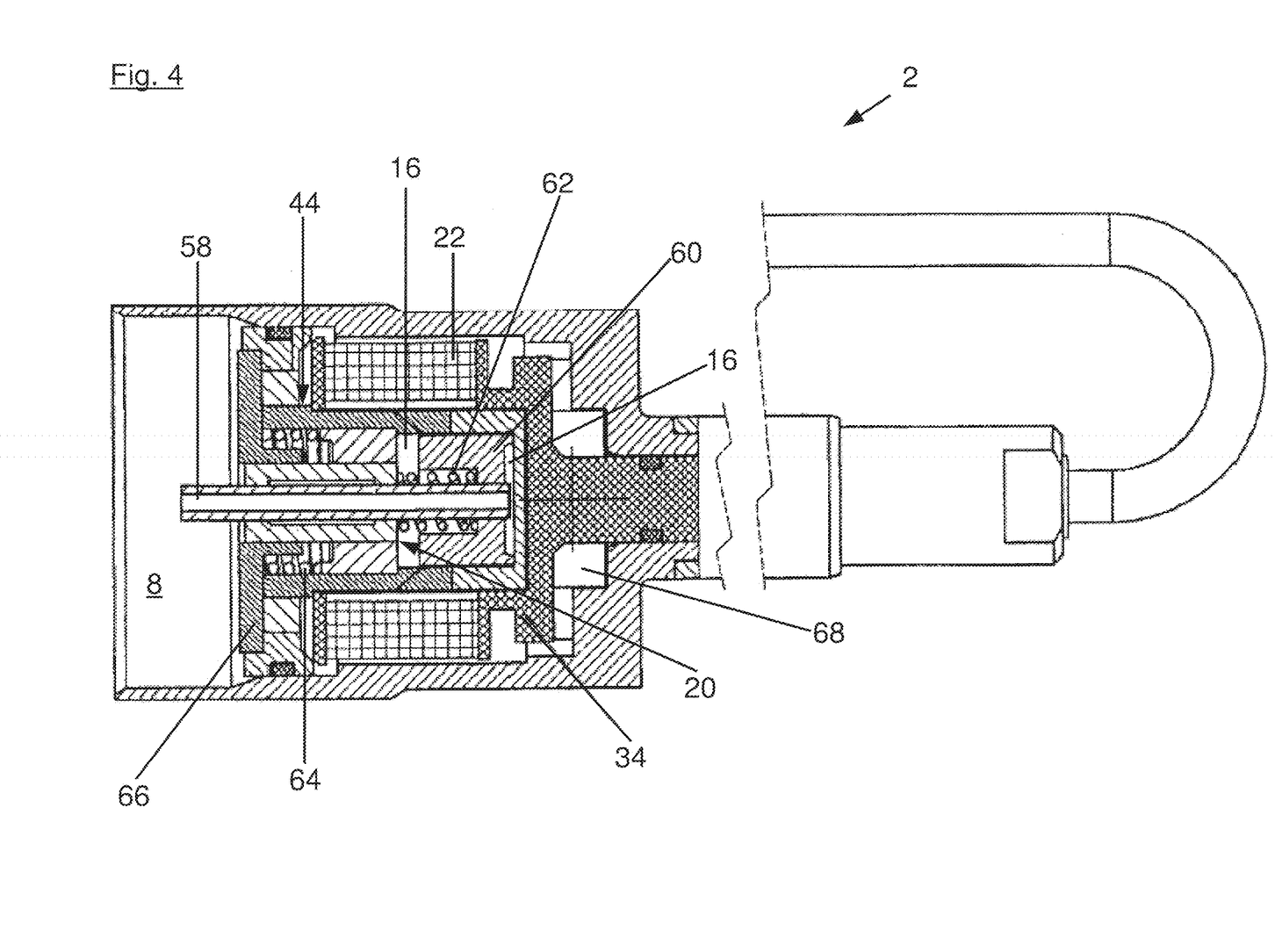
FIG. 4 shows the damping adjusting system from FIG. 1 in cross section along the movement axis perpendicular to the cross-sectional illustration in FIG. 1.

FIG. 4 shows the damping adjusting system 2 along the movement axis 4 in a section rotated by 90° about the movement axis 4 in relation to the sectional illustration of FIG. 1. As FIG. 4 shows, the electrical fitting 34 is electrically connected to the magnetic coil 22. The armature 14, which is movable back-and-forth in the inner chamber 16, consists of a constant force positioning element 58, which is formed as a hollow tappet, and a ram 60 connected thereto. The hollow tappet 58 extends through the ram 60 and is open toward the inner chamber 16, and therefore damping oil can flow through the tappet 58 without problems between the inner chamber 16 and the outer chamber 24.

A return spring 62, which drives the armature 14 electromagnetically deflected by the magnetic coil 22 back into its starting position when the magnetic coil 22 is no longer energized, is supported between the ram 60 and the support surface 20. A failsafe disk 66 fastened on a further spring 64 is used as a magnetic switch and ensures that a deflection of the armature 14 can first take place from a specific current strength applied to the magnetic coil 22.

Damping oil 8 can flow between the outer chamber 24 and the inner chamber 16 through the hollow constant force positioning element 58. In contrast, the intermediate chamber in which the magnetic coil 22 is located remains free of damping oil in this arrangement according to the invention. This also applies to the electrical fitting 34, which also remains free of damping oil.

Figure 5:
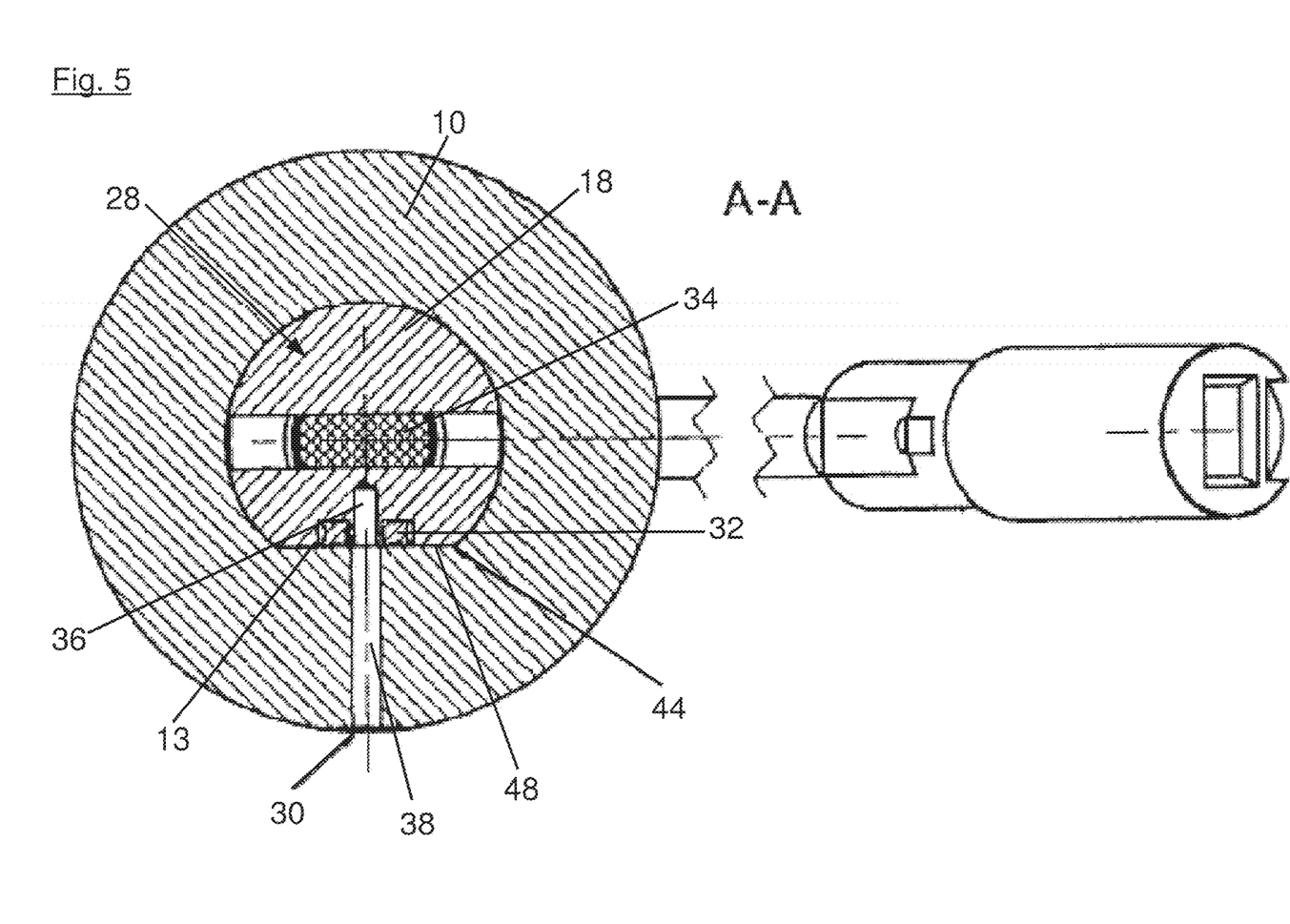
FIG. 5 shows the damping adjusting system from FIG. 1 in the cross section A-A perpendicular to the movement axis of the armature.

FIG. 5 shows a section through the damping adjusting system 2 along the section line A-A. The bottom part 18 of the guide tube 12 is accommodated in the receptacle opening 28 of the outer housing 10. The outer housing 10 has a flat partial surface 48, on which the circumferential seal ring 32 is seated. The lateral outer wall 44 of the bottom part 18 of the guide tube 12 is thus accommodated in a substantially formfitting manner in the receptacle opening 28. The circumferential seal 32 formed as a X-ring seal is accommodated in the ring-shaped groove 46 of the bottom part 18 of the guide tube 12 and seals off the venting borehole 30 from the intermediate chamber 68, in which the magnetic coil 22 is arranged. Because the X-ring 32 is seated on a flat partial surface 48, a particularly leak-tight and particularly reliable seal in relation to the intermediate chamber 68 is achieved. A further advantage of the X-ring seal is that it does not rotate when, for example, the guide tube 12 is inserted into the receptacle opening 28 of the outer housing 10.

The disclosure of the application explained on the basis of a preferred exemplary embodiment, without being restricted to this exemplary embodiment. Features of the exemplary embodiment are freely exchangeable with functionally equivalent features, if the concept of the application is preserved in this case. It is thus also possible, for example, to use an O-ring instead of a X-ring, or also, for example, to provide a non-right angle between the first subsection 50 and the second subsection 52 of the first section 36 of the venting borehole 30.

The damping adjusting system illustrated in the drawings only shows the parts of a damping adjusting system for this application. In the present case, these are the pilot stage with the magnetic coil, the armature, and the venting borehole. The valves actuable using the armature, using which finally the damping effect of the vibration damper is set, are not shown in the present application.

LIST OF REFERENCE NUMERALS 1 vibration damper
2 damping adjusting system
4 movement axis
6 damper tube, outer cylinder
8 damping medium
10 outer housing
12 guide tube, pole tube
14 armature
16 inner chamber
18 bottom part
20 support surface
22 magnetic coil
24 outer chamber
26 magnet chamber seal
28 receptacle opening
30 venting borehole
32 circumferential seal
34 electrical fitting
36 first section
38 second section
40 first opening
42 second opening
44 lateral outer wall
46 ring-shaped groove
48 flat partial surface
50 first subsection
52 second subsection
54 subregion
56 opening
58 constant force positioning element, tappet
60 ram
62 return spring
64 further spring
66 failsafe disk
68 intermediate chamber

The invention claimed is:
1. A damping adjusting system, comprising:
a guide tube, arranged in an outer housing, the guide tube having a lateral outer wall, wherein the lateral outer wall has an inner chamber that is delimited on an end face by a bottom part, a magnetic coil arranged between the outer housing and the guide tube, an electromagnetically movable armature guided in the guide tube along a movement axis, an outer chamber which encloses the outer housing, and a venting borehole, which connects the inner chamber to the outer chamber and is led through the bottom part and the outer housing, wherein the venting borehole has a first venting borehole section and a second venting borehole section, and the first venting borehole section and the second venting borehole section are connected to one another, wherein a first venting borehole section is led through the bottom part, wherein the first venting borehole section has a first opening arranged on an inner chamber side on the bottom part and a second opening arranged on the lateral outer wall, wherein the second venting borehole section is led through the outer housing, wherein the venting borehole is sealed off using a seal circumferential around the venting borehole between the guide tube and the outer housing, and wherein the first opening is arranged facing in the direction of the movement axis and the second opening is arranged facing perpendicular to the movement axis.

2. The damping adjusting system of claim 1, wherein the second opening is located frontally opposite to an opening of the second section oriented toward the inner wall of the outer housing.

3. The damping adjusting system of claim 1, wherein the first venting borehole section has a first subsection, which is led in a straight line and is open toward the inner chamber of the guide tube, and a second subsection, which is led in a straight line and is open toward the lateral outer wall of the guide tube and extends at an angle to the first subsection through the bottom part of the guide tube.

4. The damping adjusting system of claim 3, wherein an angle between the first subsection and the second subsection is a substantially right angle.

5. The damping adjusting system of claim 3, wherein the first subsection, the second subsection, or both the first subsection and the second subsection, have a subregion with a reduced diameter, and wherein the reduced diameter is between 0.2 mm and 0.3 mm.

6. The damping adjusting system of claim 1, wherein the outer housing encloses at least a part of the lateral outer wall of the guide tube in a formfitting manner.

7. The damping adjusting system of claim 3, wherein the second subsection is led through the bottom part substantially perpendicularly to the movement axis of the armature.

8. The damping adjusting system of claim 1, wherein the venting borehole is led through the outer housing substantially perpendicularly to the movement axis.

9. The damping adjusting system of claim 1, wherein the seal is an O-ring seal or an X-ring seal.

10. The damping adjusting system of claim 3, wherein the outer housing has a tubular receptacle opening in the direction toward the movement axis for accommodating the guide tube, the tubular receptacle opening having an inner surface of which has a flat partial surface, and wherein the an opening of the second section oriented toward the guide tube is formed on the flat partial surface.

11. The damping adjusting system of claim 1, wherein the seal is accommodated in a ring-shaped groove on the outer housing, on the guide tube around the venting borehole or both in a ring-shaped groove on the outer housing and on the guide tube around the venting borehole.

12. The damping adjusting system of claim 1, wherein the guide tube is a pole tube and the magnetic coil is wound around the guide tube.

13. The damping adjusting system of claim 1, wherein the armature has a return spring, which is supported in the guide tube and on a surface which delimits the inner chamber and is arranged opposite to the bottom part.

14. The damping adjusting system of claim 1, wherein the outer chamber is filled with a liquid damping medium.

15. The damping adjusting system of claim 1, further comprising:

a vibration damper having a damper tube, wherein the outer chamber is delimited by the damper tube, wherein the damper tube is formed as an outer cylinder, and wherein the outer housing is guided so that the outer housing is movable back-and-forth axially in the damper tube along the movement axis.

16. A damping adjusting system, comprising:

a guide tube, arranged in an outer housing, the guide tube having a lateral outer wall, wherein the lateral outer wall has an inner chamber that is delimited on an end face by a bottom part, a magnetic coil arranged between the outer housing and the guide tube, an electromagnetically movable armature guided in the guide tube along a movement axis, an outer chamber which encloses the outer housing, and a venting borehole, which connects the inner chamber to the outer chamber and is led through the bottom part and the outer housing, wherein the venting borehole has a first venting borehole section and a second venting borehole section, and the first venting borehole section and the second venting borehole section are connected to one another, wherein a first venting borehole section is led through the bottom part, wherein the first venting borehole section has a first opening arranged on an inner chamber side on the bottom part and a second opening arranged on the lateral outer wall, wherein the second venting borehole section is led through the outer housing, wherein the venting borehole is sealed off using a seal circumferential around the venting borehole between the guide tube and the outer housing, wherein the first venting borehole section has a first subsection, which is led in a straight line and is open toward the inner chamber of the guide tube, and a second subsection, which is led in a straight line and is open toward the lateral outer wall of the guide tube and extends at an angle to the first subsection through the bottom part of the guide tube, wherein an angle between the first subsection and the second subsection is a substantially right angle.

17. The damping adjusting system of claim 16, wherein the first opening is arranged facing in the direction of the movement axis and the second opening is arranged facing perpendicular to the movement axis.

18. A damping adjusting system, comprising:
a guide tube, arranged in an outer housing, the guide tube having a lateral outer wall, wherein the lateral outer wall has an inner chamber that is delimited on an end face by a bottom part,
a magnetic coil arranged between the outer housing and the guide tube,
an electromagnetically movable armature guided in the guide tube along a movement axis,
an outer chamber which encloses the outer housing, and
a venting borehole, which connects the inner chamber to the outer chamber and is led through the bottom part and the outer housing,
wherein the venting borehole has a first venting borehole section and a second venting borehole section, and the first venting borehole section and the second venting borehole section are connected to one another,
wherein a first venting borehole section is led through the bottom part,
wherein the first venting borehole section has a first opening arranged on an inner chamber side on the bottom part and a second opening arranged on the lateral outer wall, wherein the second venting borehole section is led through the outer housing,
wherein the venting borehole is sealed off using a seal circumferential around the venting borehole between the guide tube and the outer housing,
wherein the first venting borehole section has a first subsection, which is led in a straight line and is open toward the inner chamber of the guide tube, and a second subsection, which is led in a straight line and is open toward the lateral outer wall of the guide tube and extends at an angle to the first subsection through the bottom part of the guide tube,
wherein the first subsection, the second subsection, or both the first subsection and the second subsection, have a subregion with a reduced diameter, and
wherein the reduced diameter is between 0.2 mm and 0.3 mm.

19. The damping adjusting system of claim 18, wherein the first opening is arranged facing in the direction of the movement axis and the second opening is arranged facing perpendicular to the movement axis.

20. The damping adjusting system of claim 18, wherein the outer housing has a tubular receptacle opening in the direction toward the movement axis for accommodating the guide tube, the tubular receptacle opening having an inner surface of which has a flat partial surface, and
wherein the an opening of the second section oriented toward the guide tube is formed on the flat partial surface.

* * * * *